United States Patent [19]

Donaldson

[11] 4,210,262

[45] Jul. 1, 1980

[54] LIQUID DISPENSING APPARATUS WITH VENT VALVE

[75] Inventor: Peter Donaldson, 43 Hawthorne Way, Storrington, Sussex, England

[73] Assignees: Peter Donaldson, Storrington; David W. Moate, London, both of United Kingdom

[21] Appl. No.: 923,479

[22] Filed: Jul. 10, 1978

[51] Int. Cl.² .............................................. G01F 11/32
[52] U.S. Cl. .................................. 222/442; 222/445; 141/362
[58] Field of Search ............... 222/442, 445, 447, 448, 222/450, 449, 446, 333, 504; 141/360, 362, 361

[56] References Cited

U.S. PATENT DOCUMENTS

| 2,197,142 | 4/1940 | Cannon et al. | 222/442 |
|---|---|---|---|
| 2,314,384 | 3/1943 | Berwick et al. | 222/442 |
| 2,710,707 | 6/1955 | Persak | 141/362 X |
| 3,802,606 | 4/1974 | Gust | 222/504 X |

FOREIGN PATENT DOCUMENTS 695059  8/1953  United Kingdom .

*Primary Examiner*—Stanley H. Tollberg
*Attorney, Agent, or Firm*—Bacon & Thomas

[57] ABSTRACT

Liquid dispensing apparatus particularly for beverages has a transparent measuring chamber capable of receiving in mounting engagement an inverted bottle in communication with the measuring chamber. The chamber includes a liquid inlet port, a liquid outlet port and a downwardly resiliently biased sliding tubular valve member mounted in the outlet port. A pivotal operating member serves to urge the valve member upwards to close the inlet port, present lateral triangular apertures in the valve member to the interior of the chamber to permit liquid to pass therethrough and out through the outlet port, and open an air valve at the upper end of the valve member to permit air to enter the chamber displacing liquid leaving the chamber. An electric motor and associated gearing may be provided for raising the valve member.

12 Claims, 4 Drawing Figures

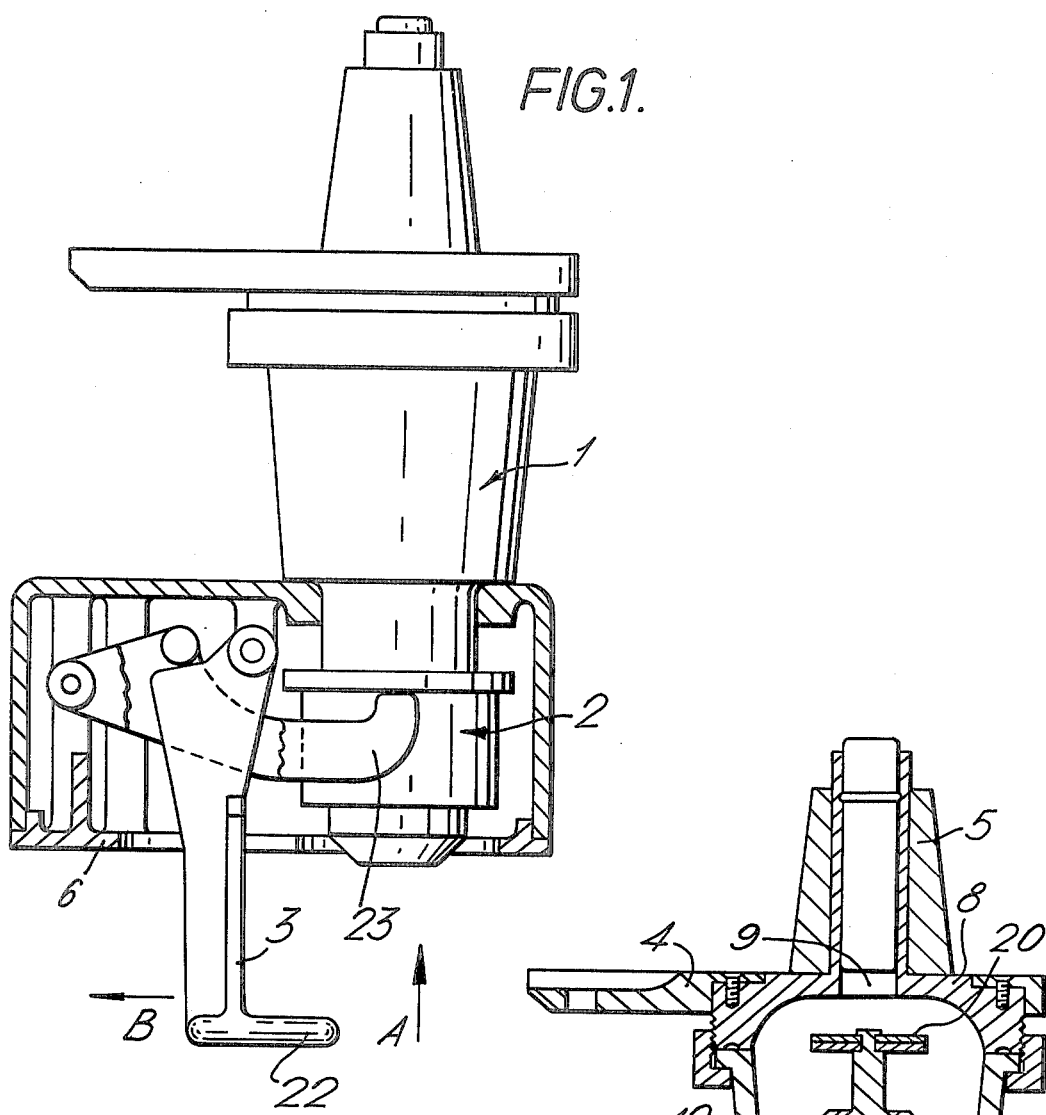

LIQUID DISPENSING APPARATUS WITH VENT VALVE

BACKGROUND OF THE INVENTION

This invention concerns improvements in or relating to apparatus for dispensing liquids of the kind including a measuring chamber adapted to be filled with liquid and valve means adapted in operation thereof to prevent further liquid entering the chamber and to permit discharge of the contents already held. Apparatus of this kind is used where it is desired to dispense liquids in discrete quantities whose volume is a fixed measure.

A particular application of such apparatus is to be found in wide-spread use in public houses, hotels, clubs and like establishments for the dispensing of spirits and like beverages. Many such devices are sold under the Registered Trade Mark "Optic". Equally such devices are used in cafes, restaurants and the like for dispensing quantities of concentrated beverages such as orange or lemon squash in which a fixed quantity is required for dilution with water to make up a beverage of the correct strength.

Such devices as are currently known and in use suffer from a number of disadvantages. For example, an air port to allow air to enter the measuring chamber to replace its contents when leaving the chamber is provided, but this is disposed in an upper region of the chamber and is open upwards with the result that dust and other dirt is allowed to enter the port whence it passes into the measuring chamber to contaminate the beverage in question.

Again, such devices as are known include an operating member comprising a pair of radially outwardly directed arms between which lies the port whence issues the liquid. To operate the device the rim of a cup, glass or like container is engaged with the arms which are moved upwardly by vertical urging of the container. The fact that the rim of the container is used to apply force to the operating member is another source of contamination since with repeated use germs can be passed from one person to another almost as if they had made oral contact.

SUMMARY OF THE INVENTION

It is an object of this invention to provide liquid dispensing apparatus in which dust and other dirt are excluded from the measuring chamber whilst air is permitted to pass thereinto to displace liquid leaving.

It is a further object of this invention to provide liquid dispensing apparatus with an operating member which requires no contact with the rim of the receiving container.

It is a still further object of this invention to provide liquid dispensing apparatus having a motorized drive.

Briefly stated the liquid dispensing apparatus according to the invention comprises a measuring chamber having an inlet port to allow liquid to enter the chamber and an outlet port to allow liquid in the chamber to leave, and a valve member extending into the chamber and adapted on actuation thereof to close said inlet port and open said outlet port, said valve member including at or near its inner end an air valve adapted on actuation of the valve member to open into an upper region of the chamber to permit air to enter the chamber to replace liquid leaving. The provision of the air valve at or near the end of the valve member enables air to smoothly replace the liquid in the chamber as it leaves, and the air inlet for the valve can be disposed within the valve member and be downwardly open to prevent settling dust or dirt from entering.

The valve member will preferably be generally tubular and resiliently biased to close the outlet port. It may be provided with one or more lateral apertures, preferably generally triangular in shape, adapted to open into said chamber on actuation of said valve member liquid flowing in operation therethrough and thence through the outlet port.

A number of different constructions for the air valve are possible provided it operates in the aforesaid manner, i.e. be opened on actuation of the valve member. Furthermore one or more parts of the air valve may co-operate with said inlet port to close said port as hereinbefore described. Thus the air valve may comprise a resiliently mounted valve button adapted on actuation of the valve member to sealingly abut against the outlet port. The valve button may further include a valve surface co-operating with a valve seat on said valve member to form said air valve, or in a presently preferred arrangement the button co-operates with a resiliently mounted air valve member to open said air valve after said outlet port has been closed.

For the preferred application of dispensing beverages the measuring chamber will preferably be made wholly or partly transparent and may include means for receiving in mounting engagement an inverted bottle. For this application a preferred and useful feature is the provision of a pivotally mounted operating member, adapted on pivotable movement thereof to actuate said valve member, as opposed to the hitherto used upwardly slidingly moved operating member. This enables the side wall of, say, a glass to be used for operating apparatus rather than the rim thereof.

To reduce the effort required to manually actuate the valve member there may be provided electrical motor with associated gearing if necessary serving to actuate the valve member. Such motor would generally be connected to a switch operated by a pivotally mounted operating member as aforesaid.

BRIEF DESCRIPTION OF THE DRAWINGS

In order that the invention may be readily understood certain embodiments thereof will now be described by way of example with reference to the accompanying drawings in which:

FIG. 1 is a side elevation, partly in section, of a beverage dispensing apparatus, FIG. 2 is a view of apparatus on Arrow A, FIG. 3 is a longitudinal sectional view of the measuring chamber and valve member.

DESCRIPTION OF THE PREFERRED EMBODIMENTS

Figure 4:
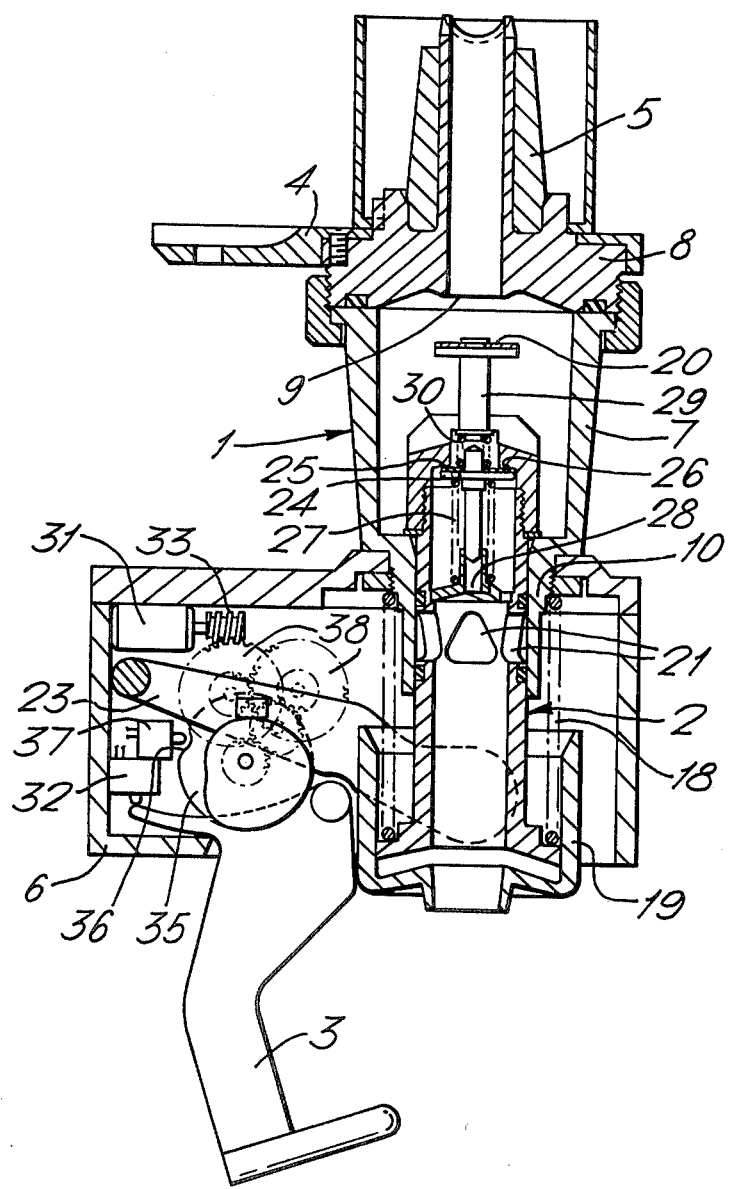
FIG. 4 is a sectional view of a further embodiment.

As shown in the drawings, the beverage dispensing apparatus comprises a measuring chamber 1 made of transparent plastics, a tubular valve member 2, a valve operating member 3, mounting bracket 4, and bottle mounting means 5. The workings of the device are encased in a two-part housing 6.

Referring in particular to FIG. 3, the measuring chamber 1 which is in two parts, a lower bowl part 7 and an upper closure 8, includes an inlet port 9 and an outlet port 10. The outlet port 10 is formed as a tubular extension of the measuring chamber and provides a substantial inner bearing surface for vertical sliding movement of the valve member 2 as will hereinafter be described. This bearing surface is considerably longer than that in existing devices and thus provides improved support against possible pivotal movement of the valve member 2.

At the upper end of the valve member 2 is mounted an air valve comprising a valve housing 11 in which is disposed a valve button 12 urged into resilient sealing engagement with the housing by spring 13 acting on washer 14. Washer 14 provides an upper mounting for air pipe 15 which extends through valve member 2 and has its outlet 16 disposed adjacent the outlet 17 of the valve passage.

On upward of the valve member 2 which is resiliently biased downwardly by spring 18 acting on lifting collar 19, inlet aperture 9 is closed by washer 20 mounted on the valve button 12. Continued upward movement of the valve members causes valve button 12 to move downwardly against spring 13 to open the upper end of the air passage and lateral ports 21 come into communication with the measuring chamber 1 to allow discharge of its contents out through port 17 into the waiting drinking container below (not shown).

The air valve permits air to enter the measuring chamber 1 to displace liquid leaving the chamber although in operation some liquid may also pass through the air valve and descend into the waiting container through washer 14 which is apertured for this purpose.

When all the contents have left the measuring chamber the valve member 2 is allowed to return under the force spring 18 to the position shown where the ports 21 are closed, the air valve is closed, and the inlet port 9 is open to allow liquid to flow into and fill the measuring chamber 1.

It is a significant feature of this invention that the outlet of the air passage faces downwardly and is disposed at the lower end of the valve member. In this way dust or other dirt falling around the device cannot enter the air passage and thereby cause contamination of the beverage.

It will be seen that the vertical movement of the valve member 2 is obtained by pivotally moving valve operating member 3. This is a significant advantage over known devices where the drinking container is applied to arms mounted directly on the valve member 2 which then requires an upward force to operate the valve member. In the embodiment shown however the valve operating member 3 includes a v-shaped lower portion 22 adapted to receive a drinking container. Pivotal movement of the operating member (it is shown in the drawings mid-way in its stroke) causes the connecting link 23 to pivot anti-clockwise and to raise the valve member 2 by means of lifting collar 9. Thus the rim of, for example, a glass from which a beverage had already been consumed does at no time come into contact with the device.

Turning now to FIG. 4 there is shown a modified embodiment having a somewhat modified air valve and also being provided with an electrical motor for lifting the valve member 2. Like numerals to those used in FIGS. 1 to 3 are used in FIG. 4 and only those parts which differ substantially from the first embodiment will be described.

The air valve in this embodiment comprises a valve member 24 having an elastomeric sealing member 25 urged into engagement with a valve seat 26 by means of a spring 27 supported at its other end on a crosspiece 28; this valve is adapted to be opened by plunger 29 in the following way. When valve member 2 is lifted, the sealing washer 20 on plunger 29 will first come into contact with the inlet port valve seat 9. Continued upward movement of the valve member 2 causes the plunger to ride down against the resilience of biasing spring 30 which is supported at its other end on air valve member 24, until the axial force on member 24 overcomes the resilience of spring 27 to open the air valve.

At this time, the lateral apertures 21 are in communication with the interior of measuring chamber 1 and the liquid therein will flow out through said apertures whilst air flows into the upper region of the chamber through the air valve. The apertures are made triangular in shape, as shown, in order to allow further passage of air through said apertures whilst the liquid flows out through the lower parts.

Whilst upward movement of the valve member 2 could be effected by a mechanical linkage in the FIG. 1 embodiment, in this case an electrical motor 31 is provided to perform such upward movement.

On actuation of the member 3 in the clockwise direction, a micro-switch is actuated causing the motor 31 by means of pinion 33 and gears 38 to rotate the lifting cam 34 to lift the arm 23, thereby raising the member 2. A control cam 35 actuates another micro-switch 37 once the motor has started to lock the electric circuit to the motor in the closed condition until such time as the depression 36 comes into registry with micro-switch 37 as shown, whereupon the cycle will terminate.

It should be noted that in this embodiment no air pipe 15 as was provided in the first embodiment is necessary, the tubular valve member 2 itself having been found sufficient to permit discharge of liquid as well as entry of air.

As an alternative to providing a cam and lifting lever for actuating the operating member 2, the motor 31 could be arranged to rotate the operating member about its longitudinal axis, the member being formed with a coarse spiral thread in which engages one or more lugs provided on the tubular extension of the measuring chamber such that rotation of the operating member causes it to rise. Equally, the tubular extension could be provided with a thread and one or more lugs be formed on the operating member with the same result.

Again, as an alternative to a rotational electric motor, a solenoid could be used for effecting vertical movement of the operating member, either acting directly on said member or an extension thereof, or through a mechanized linkage.

Whether a solenoid or a rotational motor is used, it will be necessary to provide electric power to the apparatus. For safety reasons a low voltage, say 9 or 12 volts will generally be used, and this can conveniently be led to the apparatus by means of terminals mounted in the mounting bracket 4 which engage with registering terminals in a wall or shelf mounting for the apparatus. In this way the power is automatically disconnected from the apparatus when dismounted for changing a bottle with practically no inconvenience to bar staff.

It will be understood that the embodiments described above are by way of example only and that modifications and alterations may be made thereto without departing from the spirit and scope of the invention as defined in the appended claims.

What is claimed is:

1. Liquid dispensing apparatus comprising:

(a) a measuring chamber,
(b) an inlet port provided in said measuring chamber permitting liquid to enter the measuring chamber,
(c) an outlet port provided in said measuring chamber permitting liquid to leave the measuring chamber,
(d) a valve member disposed in said measuring chamber closing said inlet port on actuation thereof and opening said outlet port, said valve member being generally tubular and having at least one lateral aperture opening into said measuring chamber on actuation of the valve member such that liquid passes through said aperture and thence through the outlet port, and
(e) an air valve disposed in said valve member at its end in the chamber opening on actuation of the valve member into an upper region of the measuring chamber permitting air to enter the chamber to displace liquid as it leaves the chamber.

2. Liquid dispensing apparatus as claimed in claim 1 said at least one aperture being generally triangular in cross section.

3. Liquid dispensing apparatus as claimed in claim 1 further including a pivotally mounted operating member actuating said valve member on pivotal movement thereof.

4. Liquid dispensing apparatus as claimed in claim 1 said air valve comprising a resiliently mounted valve button sealingly abutting against the inlet port on actuation of the valve member.

5. Liquid dispensing apparatus as claimed in claim 4 said air valve further including a resiliently mounted air valve member arranged to be engaged and opened by said valve button after said inlet port has been closed.

6. Liquid dispensing apparatus comprising:
(a) an at least partly transparent measuring chamber,
(b) an inlet port provided in said measuring chamber permitting liquid to enter the measuring chamber,
(c) an outlet port provided in said measuring chamber permitting liquid to leave the measuring chamber,
(d) a generally tubular valve member disposed for sliding movement in said outlet port and including means for sealing said inlet port on actuation thereof, said valve member having at least one lateral aperture opening into said measuring chamber on actuation of the valve member such that liquid passes through said aperture and thence through the outlet port,
(e) means for permitting air to enter said measuring chamber on actuation of said valve member to displace liquid as it leaves the chamber, and
(f) an operating member pivotally mounted with respect to the measuring chamber and arranged to slide said valve member in the inlet port closing direction on pivotal movement thereof.

7. Liquid dispensing apparatus as claimed in claim 6 said operating member including a v-shaped lower portion for receiving a container for dispensed liquid.

8. Liquid dispensing apparatus as claimed in claim 7 including an electric motor serving to drive said valve member in its inlet port closing direction said operating member controlling a switch for the motor.

9. Liquid dispensing apparatus comprising:
(a) an at least partly transparent measuring chamber,
(b) an inlet port provided in said measuring chamber permitting liquid to enter the measuring chamber,
(c) means on said measuring chamber for receiving in mounting engagement an inverted bottle,
(d) conduit means for communicating the neck of said bottle with said inlet port,
(e) an outlet port provided in said measuring chamber permitting liquid to leave the measuring chamber,
(f) a tubular valve member disposed for sliding movement in said outlet port and including means for sealing said inlet port on actuation thereof,
(g) a plurality of generally triangular lateral apertures in said valve member opening into the measuring chamber on actuation of said valve member such that liquid passes through said apertures and thence through the outlet port,
(h) an air valve disposed at the inner end of the valve member and permitting air to enter the chamber on actuation of the valve member to displace liquid as it leaves the chamber, and
(i) an operating member pivotally mounted with respect to the measuring chamber and arranged to slide said valve member in the inlet port closing direction on pivotal movement thereof.

10. Liquid dispensing apparatus comprising:
(a) an at least partly transparent measuring chamber,
(b) an inlet port provided in said measuring chamber permitting liquid to enter the measuring chamber,
(c) an outlet port provided in said measuring chamber permitting liquid to leave the measuring chamber,
(d) a generally tubular valve member disposed for sliding movement in said outlet port and including means for sealing said inlet port on actuation thereof, said valve member having at least one lateral aperture opening into said measuring chamber on actuation of the valve member such that liquid passes through said aperture and thence through the outlet port,
(e) a sealing ring disposed around said tubular valve member above said aperture in sliding sealing engagement with said outlet port during initial actuation of said valve member to prevent leakage therethrough from said measuring chamber, and
(f) means for permitting air to enter said measuring chamber on actuation of said valve member to displace liquid as it leaves the chamber.

11. Liquid dispensing apparatus as claimed in claim 10 including a further sealing ring disposed around said tubular valve member below said aperture in sliding sealing engagement with said outlet port.

12. Liquid dispensing apparatus as claimed in claim 6 or claim 10 said at least one aperture being generally triangular in cross section.

* * * * *